Dec. 19, 1944.  E. MARTIN ET AL  2,365,204
MULTISPEED GOVERNOR
Filed Nov. 14, 1941
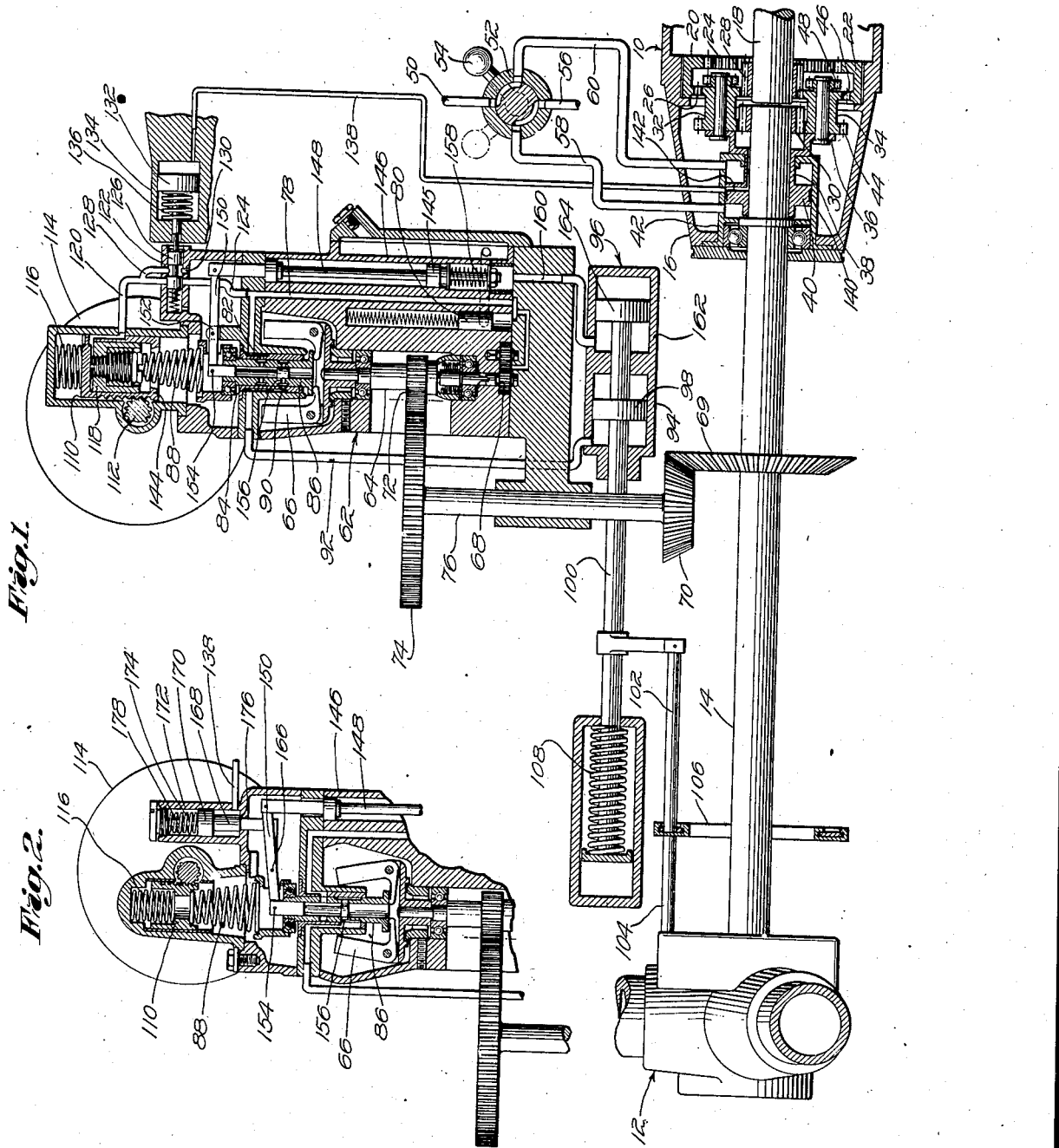
INVENTORS
*Erle Martin*
*Nelson R. Richmond*
BY
*Harris G. Luther*
*Attorneys*

Patented Dec. 19, 1944

2,365,204

UNITED STATES PATENT OFFICE 2,365,204

MULTISPEED GOVERNOR

Erle Martin, West Hartford, and Nelson R. Richmond, Thompsonville, Conn., assignors to United Aircraft Corporation, East Hartford, Conn., a corporation of Delaware Application November 14, 1941, Serial No. 419,196

13 Claims. (Cl. 170—135.6)

This invention relates to improvements in control means for change speed gears and has particular reference to an improved control for change speed gears interposed between a vehicle engine and an engine driven propeller.

An object of the invention resides in the provision of an improved control of the character indicated including means effective to facilitate the change from one speed to another by acting to reduce the speed difference between the driving and driven gear elements of the change speed gear.

A further object resides in the provision of a control mechanism of the character indicated operatively associated with a propeller pitch controlling governor to maintain a substantially constant engine speed for different ratios of the change speed drive.

A still further object resides in the provision of a control means of the character indicated operatively associated with the change speed gear in such a manner that the control means is automatically actuated whenever a gear change is initiated and serves to prevent an excessive change in engine speed during shifting of the gears and particularly when the change speed gear mechanism is in a neutral or non-driving position.

Other objects and advantages will be more particularly pointed out hereinafter or will become apparent as the description proceeds.

In the accompanying drawing, in which like reference numerals are used to designate similar parts throughout, there is illustrated, in two slightly modified forms, a suitable mechanical embodiment for the purpose of disclosing the invention. The drawing, however, is for the purpose of illustration only and is not to be taken as limiting or restricting the invention since it will be apparent to those skilled in the art that various changes in the illustrated embodiment may be resorted to without in any way exceeding the scope of the invention.

In the drawing,

Fig. 1 is a diagrammatic sectional view through a propeller drive including a change speed gear mechanism and through a speed governor showing the application thereto of a governor control constructed according to the invention, and Fig. 2 is a diagrammatic sectional view through a fragmentary portion of a speed governor showing a somewhat modified form of control mechanism constructed according to the invention.

In certain types of modern airplanes having high maximum speed and relatively heavy wing loading, it has been found desirable to provide means for changing the gear ratio between the engine and the propeller. For example, it may be found desirable to operate the propeller at a very high rotational speed and relatively low pitch angle for take-off in order to develop the necessary tractive thrust when the airplane is travelling at relatively slow speeds. As the speed of the airplane increases it is desirable to operate the propeller at a slower speed relative to engine speed so that the efficiency of the engine can be maintained at a high level without a serious loss in propeller efficiency due to excessive blade tip velocities. Various other reasons for utilizing such change speed gear drives between the engine and the propeller are known to the prior art and do not in any way affect the scope of the invention. It has so far been found satisfactory to utilize a change speed gear mechanism providing drives at two different gear ratios between the engine and the propeller. It is to be understood, however, that drives including more than two gear ratios may be utilized without in any way exceeding the scope of the invention.

Referring to the drawing in detail, the numeral 10 generally indicates a vehicle engine such as may be used for the propulsion of an airplane and the numeral 12 generally indicates a controllable-pitch propeller which may be of any suitable or desired form driven by the engine 10 and which may be of any suitable or desired form, the propeller illustrated being of the general type illustrated and described in United States application Serial No. 482,265, filed April 8, 1943, by John E. Anderson, for Pitch changing mechanisms.

The propeller is carried upon a propeller shaft 14 projecting into the front end of nosepiece 16 of the engine 10 and operatively connected with the engine power shaft 18 by a suitable gear mechanism generally indicated at 20.

The gear mechanism 20 may conveniently comprise an annular reaction gear element 22 rigidly secured in the engine casing and provided with two sets 24 and 26 of internal gear teeth, a planetary pinion gear system, a drive gear 28 on the power shaft 18 and a driven gear 30 on the propeller shaft 14. The pinion gears, two of which are indicated at 32 and 34, are mounted in the flanged annular portion 36 of a cage 38 which surrounds the propeller shaft 14 and is provided with a piston 40 reciprocable in a cylinder 42 also concentric with the propeller shaft and rigidly supported by the engine casing.

Each of the pinion gears 32 has three sets of gear teeth, as indicated at 44, 46 and 48. The sets 44 are permanently in mesh with the teeth of the driven gear 30 while the sets 46 are permanently in mesh with the teeth of the drive gear 28. When the planetary gears are in the low speed driving position, as illustrated, the gear teeth 46 are also in mesh with the large diameter set 26 of internal gear teeth in the reaction gear element 20. When the planetary gears are in the high speed driving position the small diameter sets of teeth 48 are in mesh with the small diameter set 24 of internal gear teeth in the reaction element 20 and when the change speed gear is in neutral, disconnecting the engine from the propeller, both sets of gear teeth 46 and 48 are in the space between the internal gear teeth 26 and 24 of the reaction gear element.

The planetary gears are moved from one driving position to the other by movement of the piston 40 induced by the application of hydraulic fluid under pressure to one end or the other of the cylinder 42. Hydraulic fluid under pressure is supplied through some suitable source, such as the engine lubricating oil pump, through a pressure line 50 to a valve 52 having a manual control handle 54. A drain line 56 leads from the valve and opposite sides of the valve are connected with opposite ends of the cylinder 42 by fluid lines 58 and 60. When the handle 54 is in the operative position illustrated, pressure fluid is supplied to the right hand end of the cylinder 42 moving the piston 40 to its left hand position and placing the planetary gears in their low speed driving position. If the handle 54 is moved to the position indicated by dotted lines the high pressure fluid will be supplied to the left hand end of the cylinder, the right hand end being simultaneously connected with the drain line 56, and the planetary gears will be moved to their high speed driving position. The piston 40 is so dimensioned that, taking into consideration the pressure of the fluid in the pressure line 50, the piston does not exert sufficient force to move the planetary gears as long as power is being transmitted from the shaft 18 to the shaft 14. Therefore, in order to accomplish a gear shift the pilot must not only set the handle 54 in the position corresponding to the desired speed change but must also reduce the engine power by retarding the throttle. As soon as the engine power has decreased to a predetermined value the piston 40 will move and effect the gear shift. After the indicated gear shift has been effected the throttle may be advanced to increase the engine power.

During constant speed operation the propeller pitch is controlled by a speed governor generally indicated at 62. This governor includes a rotatable shaft 64 carrying at one end the flyballs 66 and operatively connected at the other end to a fluid pump 68. This shaft is driven from the propeller shaft 14 by a suitable drive diagrammatically illustrated as including the gears 69, 70, 72 and 74 and the shaft 76 carrying the gears 70 and 74. The output of the pump 68 is led through a channel 78 past a pressure relief valve 80 which regulates the pump outlet pressure to a port 82 in a valve casing 84 within which is a reciprocable valve sleeve 86 the movements of which are controlled by the balance of forces between the flyballs 66 and the governor speeder spring 88 in a manner well known to the art. From a second port 90 in the valve casing a fluid line 92 leads to one end of a cylinder 94 of a servo-motor generally indicated at 96. Within the cylinder 94 there is a piston 98 mounted on a shaft 100 operatively connected through the links 102 and 104 and the slip joint 106 having relatively rotatable parts, with the pitch changing mechanism of the propeller 12. The shaft 100 is moved in a pitch increasing direction by the application of hydraulic fluid under pressure to the piston 98 and is moved in a pitch decreasing direction by the compression spring 108 which becomes operative when the fluid line 92 is connected with drain through the hollow valve sleeve 86. The sleeve 86 moves to connect the line 92 with the pressure line 78 or with drain in accordance with governor demands for an increase or a decrease in the speed of the power plant including the engine 10 and the propeller 12.

The speed setting of the governor may be adjusted by changing the loading on the speeder spring 88. This may be accomplished by changing the position of the movable abutment 110 by the pinion 112 rotatable by suitable means such as the manually rotatable pulley 114. The compression spring 116 to a large extent balances the force of the speeder spring 88 on the abutment 110 and removes a large portion of the abutment adjusting load from the pulley 114.

Within the cylindrical movable abutment 110 there is a second abutment in the form of a reciprocable piston 118 which directly receives the end of the speeder spring, and a fluid line 120 leads to the space between this piston and the closed end of the cylindrical abutment 110. This fluid line 120 leads to the interior of a valve casing 122 the opposite side of which is connected with the pump pressure line 78 by a branch conduit 124. Within the casing 122 there is a two position valve plunger 126 having one operative position, as illustrated, in which it connects the fluid line 120 with drain through the branch line 128 and drain port 130 and a second position in which it blocks off the drain port and connects the pressure line 124 with the fluid line 120 to admit fluid under pressure to the space between the closed end of the abutment 110 and the abutment piston 118. This valve is controlled by a piston 132 reciprocable in a cylinder 134 and urged in a direction to move the valve plunger 126 to drain position by a compression spring 136. A fluid line 138 is connected with the end of the cylinder 134 opposite the valve 122 to introduce fluid into the space between this end of the cylinder and the piston 132 to move the valve plunger 126 to the position in which it connects the line 120 with the pressure line 124. This line 138 is led into the cylinder 42 at a location such that its end is covered by the piston 40 when the piston is in the low speed and neutral positions. The piston 40 is provided in its periphery with an annular groove 140 connecting with a drain passage 142 so that the line 138 is connected with drain whenever the gear is in the low speed drive or neutral position. Since the release of pressure from the piston 132 will connect the passage 120 with drain, whenever the gear 20 is in the low speed or neutral position hydraulic fluid will be drained from the space between the piston abutment 118 and the adjustable abutment 110 allowing the piston 118 to rise and reduce the load on the speeder spring 88 thus setting the governor for a lower speed. When the piston 40 is moved to effect a high speed driving connection in the change speed gear the fluid line 138 will be connected with the line 58 which will be in turn connected with the pressure line 50 so that the piston 132 will be moved to position the plunger 126 to connect the pressure line 78, 124 with the line 120 and introduce hydraulic fluid into the space between the piston abutment 118 and the adjustable abutment 110. The piston abutment 118 will then be moved downwardly until it contacts the stop 144 thus increasing the load on the speeder spring 88 and setting the governor for a higher propeller speed.

The speeder spring 88 is so selected and the position of the stop 144 so designed that the change in the governor speed setting is the same as the change in propeller speed accomplished by shifting the change speed gear at a constant engine speed so that the governor is operative to maintain a substantially constant engine speed although the speed of the propeller is changed from one to another of two values relative to the engine speed.

By thus decreasing the propeller speed when the change speed gear is shifted from the high speed to the low speed position, prompt synchronization of the low speed drive gears is accomplished and the shifting of the gear is materially facilitated. Likewise, increasing the propeller speed when the gear is shifted in the opposite direction also hastens the synchronization of the high speed drive gears and facilitates the gear shift. In addition, placing the propeller in a slow speed high pitch condition whenever the change speed gear is in neutral will greatly minimize the danger of the propeller seriously overspeeding by windmilling with the airplane upon which it is mounted in flight.

The governor 62 is provided with a compensating device in the form of a piston 145 reciprocable in a cylinder 146 and connected by a rod 148 and a lever 150 having a fixed pivotal support at 152 with a pilot valve 154 reciprocable in the hollow valve sleeve 86 and controlling the lower port 156 in this valve sleeve. The piston 145 is urged to a neutral position in which the pilot valve 154 closes the port 156 when the flyballs 56 are in their "on-speed" position substantially parallel to the axis of the shaft 64 by a compression spring 158 and is moved away from this position by the application of fluid under pressure through a channel 160 leading from a cylinder 162 in the servo-motor 96 within which is a reciprocable piston 164 mounted on the shaft 100 in tandem with the piston 98. Since movement of the piston 164 varies the displacement in the end of the cylinder 162 to which the line 160 is connected, the piston 145, will be moved in accordance with the movements of the servo-motor piston 98 and will accordingly move the pilot valve 154 to restrict the connection between the servo-motor and the governor operated valve and thus retard the movements of the servo-motor as it approaches a position corresponding to the speed change demand of the governor as expressed by the position of the valve sleeve 86.

In the form of the invention shown in Fig. 2, the piston abutment 118 is omitted as is the piston 132, cylinder 134, valve casing 122 and plunger 126 together with the fluid lines 120, 124 and 128. The lever 150 instead of being mounted on a fixed pivotal connection is mounted on a movable connection 166 carried by a rod 168 secured to a piston 170 reciprocable in a cylinder 172. A compression spring 174 in one end of the cylinder 172 urges the piston 170 to a limiting position as determined by the stop 176 in which the pivot point 166 is at its normal or neutral position. The fluid line 138 is connected with the end of the cylinder 172 opposite that containing the spring 174 and fluid under pressure admitted through this line moves the piston to a position determined by the limit stop 178 in which the pivot point 166 is moved upwardly or towards the speeder spring 88. This movement of the pivot point 166 moves the pilot valve 154 to a position above that illustrated in Fig. 1 and at which the speeder spring 88 has to be further compressed before the valve sleeve 86 is moved by the flyballs 66 to a position in which the pilot valve closes the port 156, which position corresponds to a higher speed setting of the governor. Thus, by this means the governor is placed in a lower speed setting when the line 138 is connected with drain and in a higher speed setting when fluid under pressure is led through the line 138 into the cylinder 172. Otherwise the operation of the mechanism is the same described above in connection with Fig. 1.

While a suitable mechanical embodiment in two slightly different forms has been hereinabove described and illustrated in the accompanying drawing, for the purpose of disclosing the invention, it is to be understood that the invention is not limited to the particular embodiment so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. A control for a power plant including a driving device, a driven device, a speed responsive governor driven from said driven device and controlling the speed of said driven device at all times by effecting speed varying changes in said driven device, a change speed gear between said driving and driven devices having a high speed drive position, a low speed drive position and a neutral position, and manually actuatable means for shifting said gear, said control comprising mechanism operatively connected with and interposed between said gear shifting means and said governor for automatically providing a high speed setting for said governor whenever said change speed gear is in said high speed drive position and a low speed setting for said governor whenever said change speed gear is in said low speed drive or said neutral position.

2. The arrangement as set forth in claim 1 in which the difference between said governor speed settings is the same as the difference between said high speed and low speed gear drives.

3. In combination with a power plant including an engine, a propeller, a governor driven with said propeller, a shiftable change speed gear between said engine and said propeller providing at least two gear ratios and a decoupled condition between said engine and said propeller, and hydraulic means for shifting said gear, governor adjusting means including hydraulic means for changing the speed setting of said governor, and means operated by said gear shifting means for controlling the hydraulic means for changing the speed setting of the governor and including means for directing fluid under pressure to said governor adjusting means when said gear is in one speed ratio to establish one governor setting and to drain fluid from said governor adjusting means when said gear is in another speed ratio or decoupled condition to establish another governor setting.

4. The arrangement as set forth in claim 3 in which said governor has a speeder spring and said hydraulic means for changing the governor speed setting acts to vary the loading on said speeder spring.

5. The arrangement as set forth in claim 3 in which the governor has a speeder spring, and said hydraulic means for changing the governor speed setting includes a cylinder at one end of said spring, a piston in said cylinder forming a movable abutment for said spring, a stop carried by said cylinder at each side of said piston, and means for controlling the application of hydraulic fluid under pressure to said piston.

6. The arrangement as set forth in claim 3 including a source of hydraulic fluid under pressure for said governor, a different source of hydraulic fluid under pressure for shifting said change speed gear, a speeder spring for said governor, a hydraulic gear shifting mechanism, an expansible chamber device connected with said governor source of hydraulic fluid under pressure for changing the loading on said speeder spring, a valve for controlling the application of hydraulic fluid under pressure to said expansible chamber device, a second expansible chamber device for operating said valve, a fluid connection between said second expansible chamber device and said gear shifting mechanism, and means within said gear shifting mechanism for connecting said fluid connection with said different source of hydraulic fluid under pressure when said gear is in a high speed drive position and for venting said fluid connection to drain when said gear is in a low speed drive position or in said decoupled condition.

7. The arrangement as set forth in claim 3 including a source of hydraulic fluid under pressure for said governor, a different source of hydraulic fluid under pressure for shifting said change speed gear, a speeder spring for said governor, a hydraulic gear shifting mechanism, an expansible chamber device connected with said governor source of hydraulic fluid under pressure for changing the loading on said speeder spring, a valve for controlling the application of hydraulic fluid under pressure to said expansible chamber device, a second expansible chamber device for operating said valve, a fluid connection between said second expansible chamber device and said gear shifting mechanism, and means within said gear shifting mechanism for connecting said fluid connection with said different source of hydraulic fluid under pressure when said gear is in a high speed drive position and for venting said fluid connection to drain when said gear is in a low speed drive position or in said decoupled condition said means within said gear shifting mechanism comprising a gear shifting piston having a drain channel leading from the periphery thereof and dimensioned to cover the end of said fluid connection when said gear is in its low speed position or its decoupled condition.

8. The arrangement as set forth in claim 3 in which said governor has a compensating pilot valve and said hydraulic means for changing the governor speed setting acts to change the position of said pilot valve.

9. The arrangement as set forth in claim 3 including, a governor compensating pilot valve, a lever carrying said valve, a movable pivot for said lever, an expansible chamber device for moving said pivot to change the position of said pilot valve, hydraulic means for shifting said gear, and a fluid connection between said expansible chamber device and said gear shifting device.

10. In combination with an aircraft engine and controllable pitch propeller, a change speed transmission between said engine and said propeller, shifting means for changing the speed ratio of said transmission, adjustable governor means for controlling the speed of said propeller by controlling the pitch thereof, manually operated means for adjusting said governor to provide a selected engine speed, and means controlled by said shifting means for adjusting said governor, while maintaining the setting of said manually operated means, to change the propeller speed in accordance with the change made in said transmission ratio by said shifting means.

11. In combination with an aircraft engine and a controllable-pitch propeller, a change speed mechanism connecting said engine and said propeller, shifting means for changing the speed ratio of said transmission, adjustable governor means driven from the propeller side of said change speed mechanism for controlling the speed of said propeller by controlling the pitch thereof, manually operated means for adjusting the speed setting of said governor, and means controlled by said shifting means for additionally adjusting the speed setting of said governor when the speed ratio of the transmission is changed, whereby the propeller speed is always controlled and the engine speed is maintained at substantially the same selected value for different speed ratios of said transmission.

12. A control for a power plant including a driving device, a controllable-pitch propeller driven thereby, a speed responsive governor driven by said propeller and controlling the speed of said propeller at all times by effecting changes in the propeller pitch, a change speed gear between said driving and driven devices having a high speed drive position, a low speed drive position and a neutral position, and manually actuatable means for shifting said gear, said control comprising mechanism actuated only on shifting of said gear and operatively connected with and interposed between said gear shifting means and said governor for automatically providing a high speed setting for said governor whenever said change speed gear is in said high speed drive position and a low speed setting for said governor whenever said change speed gear is in said low speed drive or said neutral position.

13. The arrangement as set forth in claim 12 in which the governor high speed setting and the governor low speed setting are proportional to the change speed gear high speed ratio, and the change speed gear low speed ratio.

ERLE MARTIN.
NELSON R. RICHMOND.